US012766933B2

(12) United States Patent
Kemp

(10) Patent No.: US 12,766,933 B2
(45) Date of Patent: Oct. 20, 2026

(54) PORTABLE SUN VISOR

(71) Applicant: Gary Kemp, San Antonio, TX (US)

(72) Inventor: Gary Kemp, San Antonio, TX (US)

( * ) Notice: Subject to any disclaimer, the term of this patent is extended or adjusted under 35 U.S.C. 154(b) by 0 days.

(21) Appl. No.: 19/010,088

(22) Filed: Jan. 5, 2025

(65) Prior Publication Data

US 2026/0192637 A1 Jul. 9, 2026

(51) Int. Cl.
*B60J 3/02* (2006.01)
*B60J 3/06* (2006.01)

(52) U.S. Cl.
CPC ............... *B60J 3/0247* (2013.01); *B60J 3/06* (2013.01)

(58) Field of Classification Search
CPC .............................. B60J 3/0247; B60J 3/0286
USPC ................................................ 296/97.7, 97.8
See application file for complete search history.

(56) References Cited

U.S. PATENT DOCUMENTS 3,649,069 A * 3/1972 Zip ............................ B60J 3/02 160/DIG. 12
4,406,246 A * 9/1983 DeMeyer ................ B05B 12/20 118/301
5,165,462 A * 11/1992 Kang ..................... B60J 3/0286 160/370.21
5,263,760 A * 11/1993 Sohol ......................... B60J 3/02 248/467
5,588,476 A * 12/1996 Trethewey ............. B60J 3/0286 248/205.8
6,402,222 B1 * 6/2002 Avitsur .................. B60J 1/2091 296/97.1
6,976,523 B2 * 12/2005 Huang ................... B60J 1/2091 296/97.7
7,163,182 B2 * 1/2007 Lee ......................... F16B 47/00 248/205.8
8,287,025 B1 * 10/2012 Bandola ................. B60J 3/0208 296/97.1
8,845,002 B1 * 9/2014 Desphande ............ B60J 3/0247 296/97.7
9,475,643 B1 * 10/2016 Odman .................. B65G 39/20
9,873,311 B1 * 1/2018 Bonati ................... B60J 3/0286
2020/0269664 A1 * 8/2020 Eatherly ................ B60J 3/0286
2021/0229533 A1 * 7/2021 Yousefi .................... B60J 3/005

FOREIGN PATENT DOCUMENTS

KR 20030020253 A * 3/2003

* cited by examiner

*Primary Examiner* — Gregory A Blankenship
(74) *Attorney, Agent, or Firm* — HULSEY P.C.

(57) ABSTRACT

The portable sun visor has a sun visor panel affixed to a suction cup with a handle that allows the user to temporarily place the visor to any point on a windshield to shade the user's eyes from the sun.

6 Claims, 10 Drawing Sheets

PORTABLE SUN VISOR

FIELD

The present invention relates to automotive sun visors and more particularly to a portable sun visor wherein the user may temporarily place the visor at any point on a windshield or side window to shade the user's eyes from the sun.

DESCRIPTION OF THE PRIOR ART

Sun visors are a desired feature of an automobile. They are used to shade the eyes of the occupant from the sun or other light sources that may impede vision. Present visors are comprised of a base portion and an adjustable visor portion. The base portion is affixed to or in proximity to the windshield and an adjustment means provides the user the ability to manipulate the visor portion to a position that shades the eyes from the sun. The locations on a windshield that prior art designs can cover are limited because the mechanical adjustment of the visor from the affixed base to the desired visor position is limited. A visor that can reach from the base portion of the visor to every possible point on a windshield or side window that would position the visor between the sun and the eyes of the user regardless of the angle of the sun to the user would be complicated and expensive. The current factory standard for a sun visor covers the top portion of the windshield or side window. When deployed in front of the user the width of the visor covers most of the width of the windshield portion in front of the user. If the sun is adjacent to and at the same elevation as the line of sight to a traffic signal the factory design blocks both the sun and the traffic signal. There are other configurations of sun visors that are affixed to the windshield or to the original visors that extend the coverage of the visors but none of these designs have the portability to be placed where needed with a small enough footprint that allows the user to see to the sides or even above the visor when in use.

SUMMARY

The portable sun visor described herein has a suction cup, a visor portion and a handle portion held together by a retainer clip. To temporarily affix the visor to the windshield or side window the user, with handle in hand, places the visor in the desired location and presses the suction cup portion of the assembly against the glass until the suction cup takes hold. When the user wishes to remove the visor, the handle is pulled away from the glass until the suction cup releases its grip. When not in use the portable visor can be stored in a console, glove compartment or at a location on the windshield that is out of the way of the driver's view. The present invention allows the user to shade the eyes from any vantage point. The present invention can block incoming light from below eye level, from the sides or above eye level. The present invention has a small enough footprint that the visor can shade the eyes but still allow the user to see items to the sides of the visor such as traffic signals, pedestrians, signage and vehicles. The visor portion of the present invention is comprised of two visor panel components. The visor panels are rotatably attached between the suction cup and the handle. Each visor panel component is of a polarized sheet wherein relative rotation of the visor panels to each other adjusts the amount of light that may pass through the visor panel pair. The visor panel pair can reach maximum light blockage when the relative polarizations of each sheet are at 90 degrees of each other. The polarized panels allow the maximum light to pass through when the relative polarizations are aligned at 0 degrees to each other. A single tinted visor panel can be used in place of the polarized pair if the adjustability of the light passage is not desired.

DETAILED DESCRIPTION OF THE PREFERRED EMBODIMENT

The portable sun visor has a suction cup affixed to a handle with a visor portion located between the handle and the suction cup. The visor portion is comprised of two optically polarized sheets rotatably mounted wherein relative rotation of the sheets to each other will adjust the visibility through the two polarized sheets.

Figure 1:
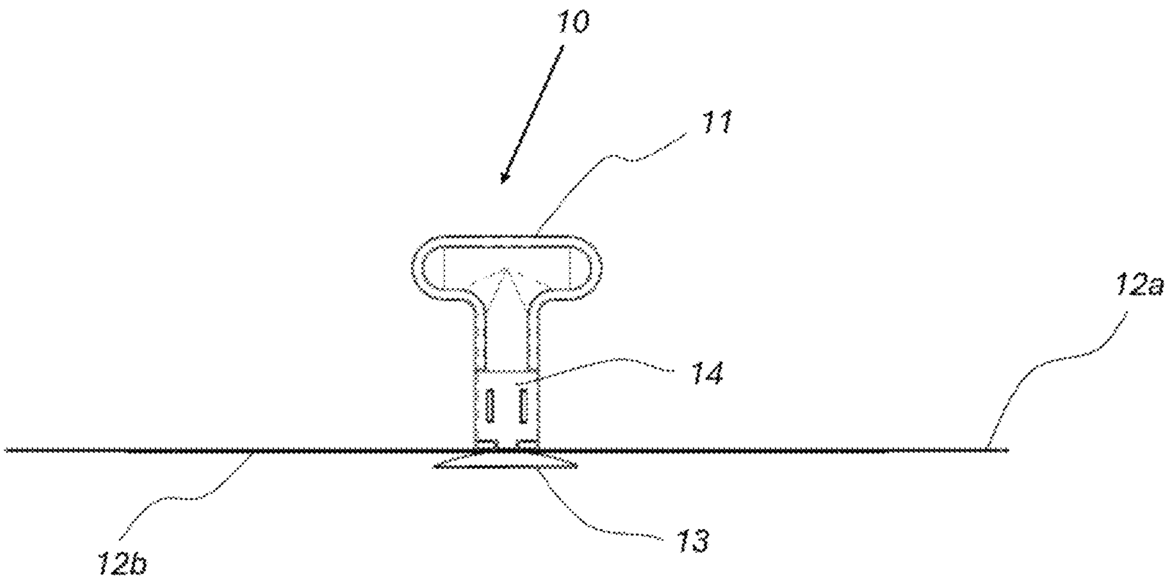
FIG. 1 is a front view of the visor assembly.
Figure 2:
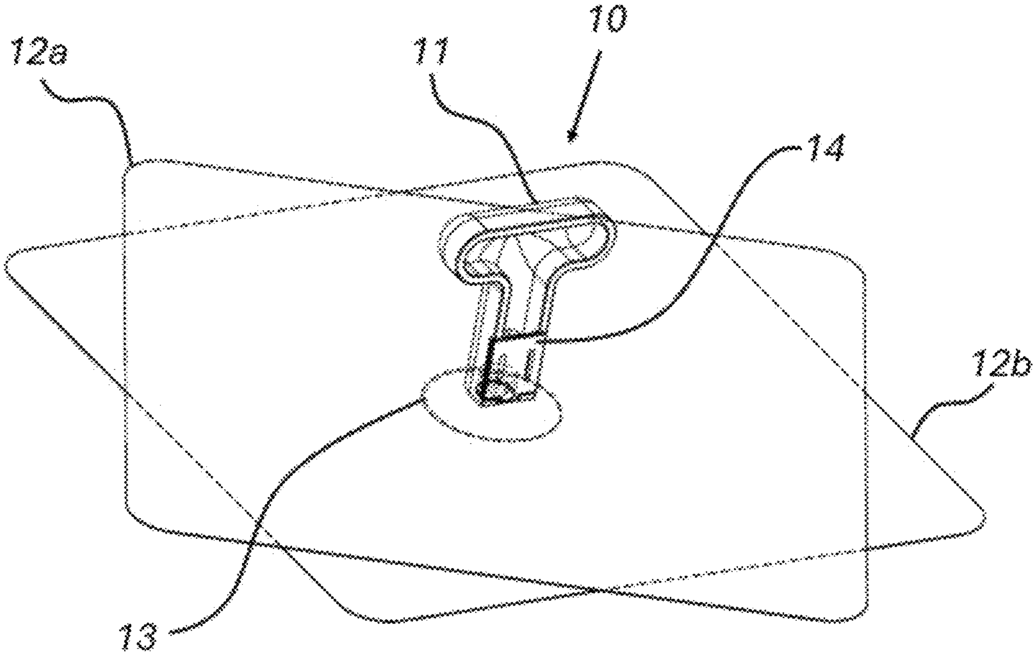
FIG. 2 is an isometric view of the visor assembly.
Figure 3:
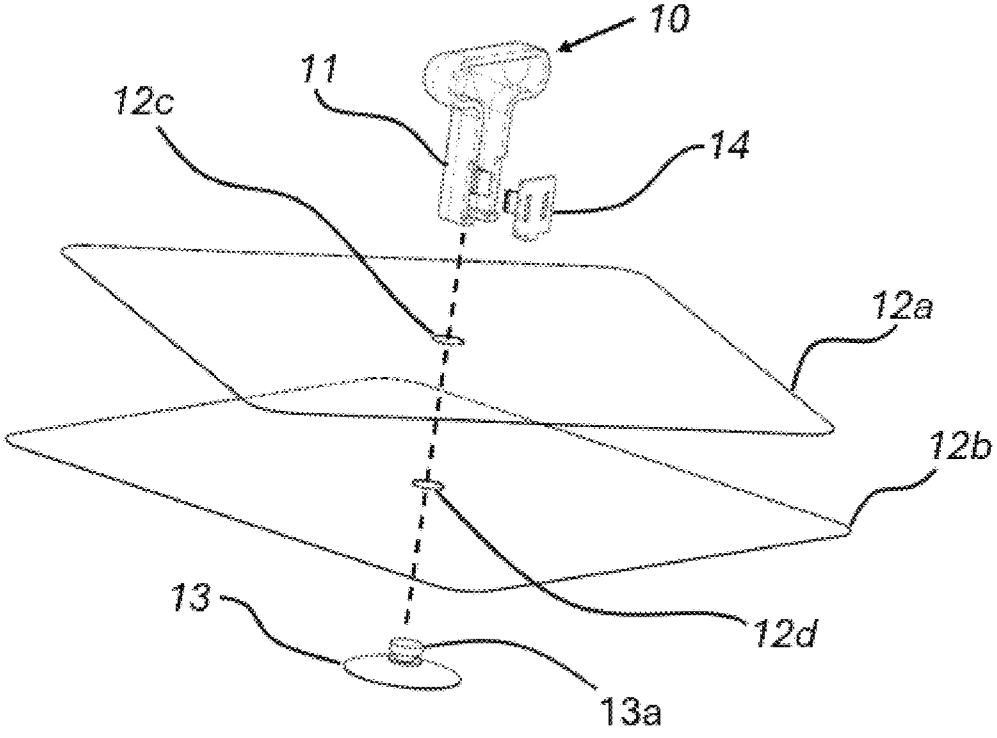
FIG. 3 is an exploded view of the visor assembly.
Figure 4:
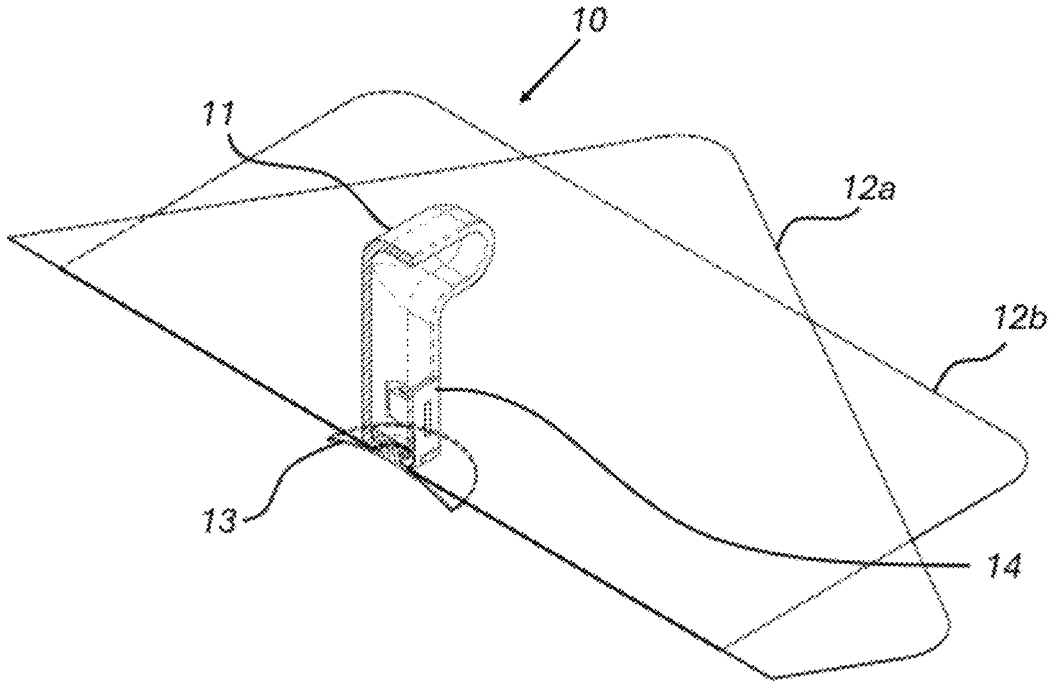
FIG. 4 is a cutaway view of the visor assembly.
Figure 5:
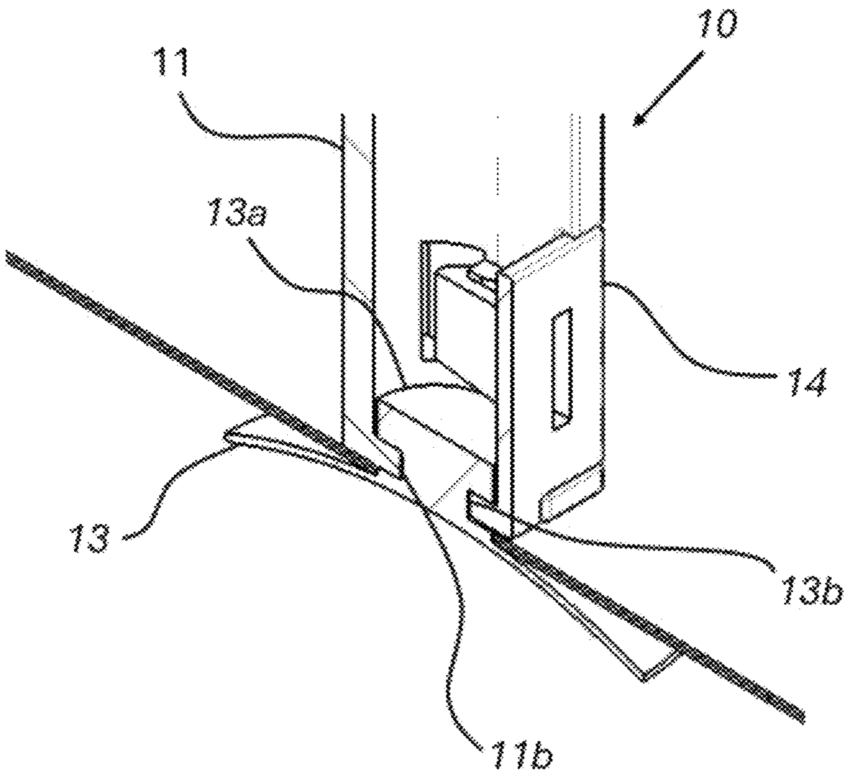
FIG. 5 is an enlarged cutaway view of the visor assembly.
Figure 6:
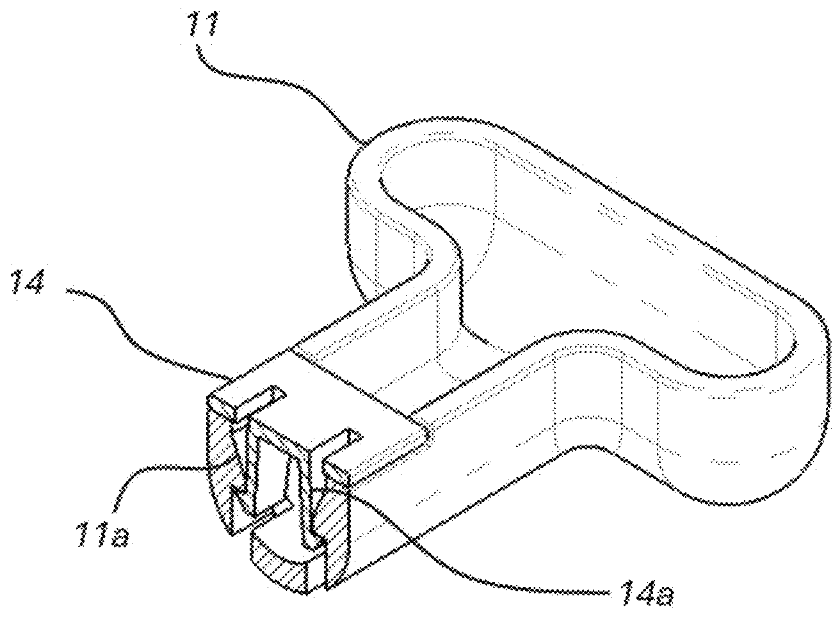
FIG. 6 is a cutaway view of the retainer clip and handle interface.
Figure 7:
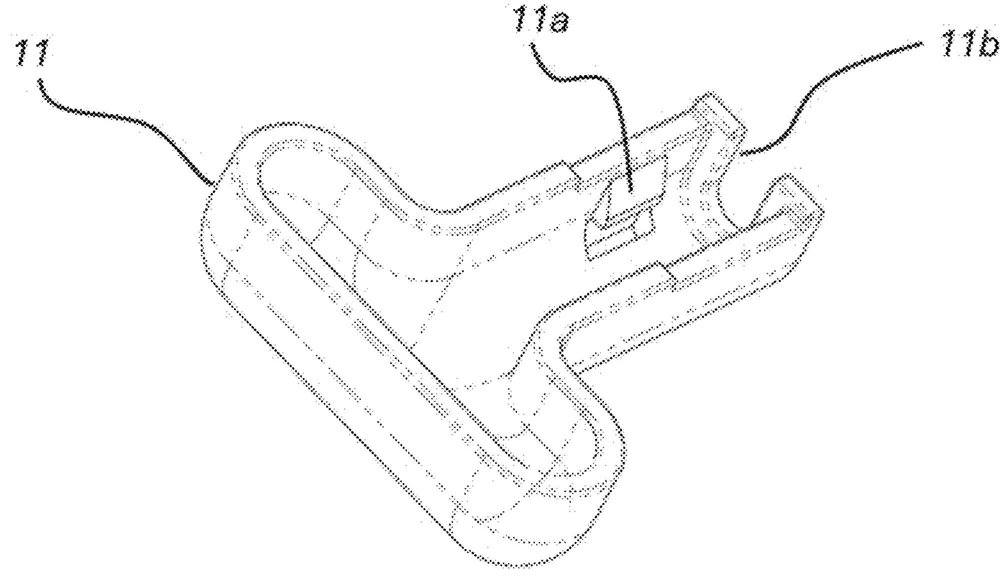
FIG. 7 is a component view of the handle.
Figure 8:
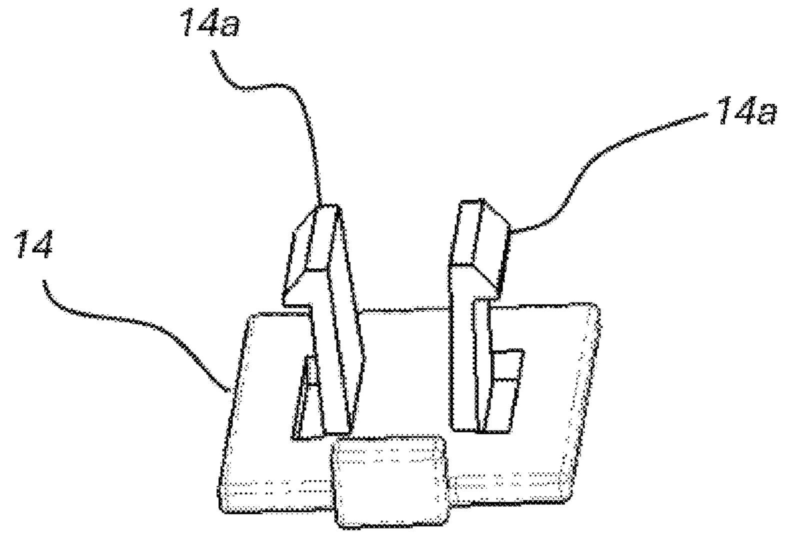
FIG. 8 is a component view of the retainer clip.
Figure 9:
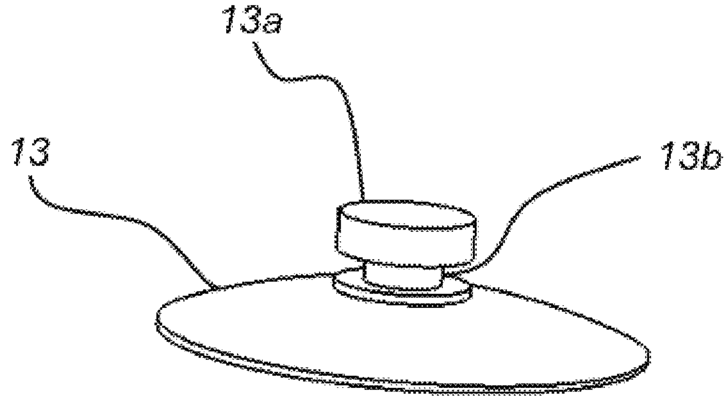
FIG. 9 is a component view of the suction cup.
Figure 10:
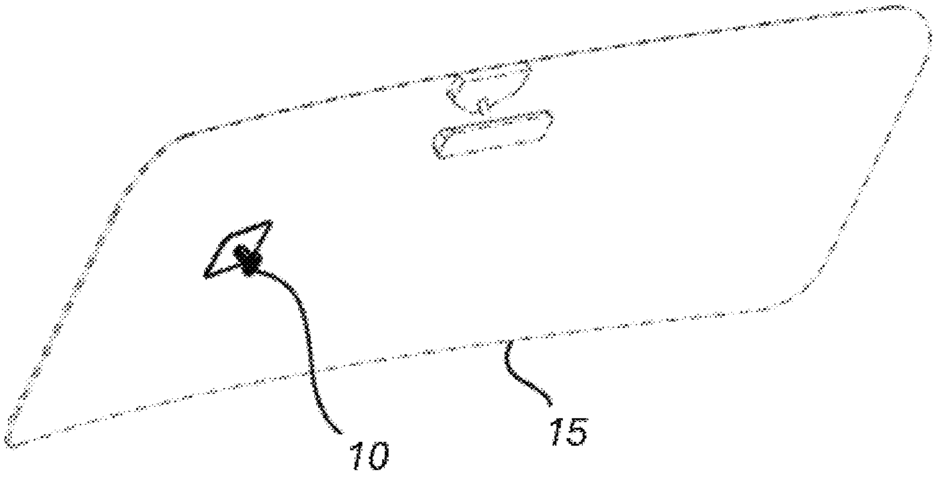
FIG. 10 is a view of the visor randomly positioned on an automobile windshield.

Referring to FIGS. 1 and 2, the portable sun visor 10 has a handle 11, a visor portion comprised of parts **12*a* and 12*b*, a suction cup 13 and a retainer clip 14. In FIG. 3 the visor portion 12*a* has a hole 12*c* and the visor portion 12*b* has a hole 12*d*. The suction cup 13 has a cylindrical protrusion 13*a*. The protrusion 13*a* of the suction cup 13 is inserted through the holes 12*d* and 12*c* prior to mating with the handle 11 and then being captured by the retaining clip 14. FIG. 4 depicts the assembled components. FIG. 5 is an enlarged view of FIG. 4 assembled components of the visor assembly 10 that shows the suction cup 13, suction cup protrusion 13*a* and suction cup groove 13*b* captured between the handle 11 and the retainer clip 14. FIG. 6 is a cutaway view of the interface between handle 11 and the retainer clip 14. FIG. 6 shows the retainer clip fingers 14*a* hooked over the handle steps 11*a* to secure the assembly. FIG. 7 is a component view of handle 11 with the steps 11*a* and the slot 11*b* identified. FIG. 8 is a component view of retainer clip 14 with the retainer clip fingers 14*a* identified. FIG. 9 is the component view of suction cup 13 with the protrusion 13*a* and the groove 13*b* identified. The visor assembly depicted in figures FIG. 1 through FIG. 9 show a visor assembly capable of being placed anywhere on a windshield or side window to shade the user's eyes from the sun or other light sources. The two visor panels having the ability to rotate in relation to each other provides a way to take advantage of the pair of polarized panels' ability to adjust the amount of light that is allowed to pass through the visor panels. It can be surmised from this disclosure that a single panel can also be used if the amount of light passing through the panel is not to be adjustable in the manner that two polarized visor panels provide. FIG. 10 shows the portable sun visor affixed to a windshield at a random location. FIG. 10** shows how the footprint of the current invention does not restrict the vision above, below or to the sides of the visor panels.

It is to be understood that the portable sun visor is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A portable sun visor, comprising:

a handle a suction cup comprising a protrusion;

a first visor panel having a first hole;

a second visor panel having a second hole, said second visor panel being placed above said first visor panel, wherein said protrusion is inserted through said first hole and said second hole, wherein said protrusion mates with said handle; and a retainer clip securing said protrusion to said handle, wherein said first visor panel and said second visor panel are polarized sheets rotatably mounted between said suction cup and said handle, and wherein said first visor panel and said second visor panel are rotatable relative to each other to adjust visibility therethrough.

2. The portable sun visor of claim 1 wherein said first visor panel and said second visor panel are alignable at zero degrees relative polarization to allow maximum light to pass therethrough.

3. The portable sun visor of claim 1 wherein said first visor panel and said second visor panel are alignable at 90 degrees relative polarization for maximum light blockage therethrough.

4. The portable sun visor of claim 1 wherein said handle comprises handle steps, said retainer clip comprises retainer clip fingers, and wherein said retainer clip fingers hook over said handle steps to secure said handle to said suction cup.

5. A portable sun visor, comprising:

a handle;

a suction cup comprising a protrusion;

a visor panel having a hole;

a retainer clip securing said protrusion to said handle, wherein said visor panel is a polarized sheet rotatably mounted between said suction cup and said handle.

6. The portable sun visor of claim 5 wherein said handle comprises handle steps, said retainer clip comprises retainer clip fingers, and wherein said retainer clip fingers hook over said handle steps to secure said handle to said suction cup.

* * * * *